June 29, 1943. N. J. POUX 2,322,908
SLIDE FASTENER
Filed Dec. 19, 1940
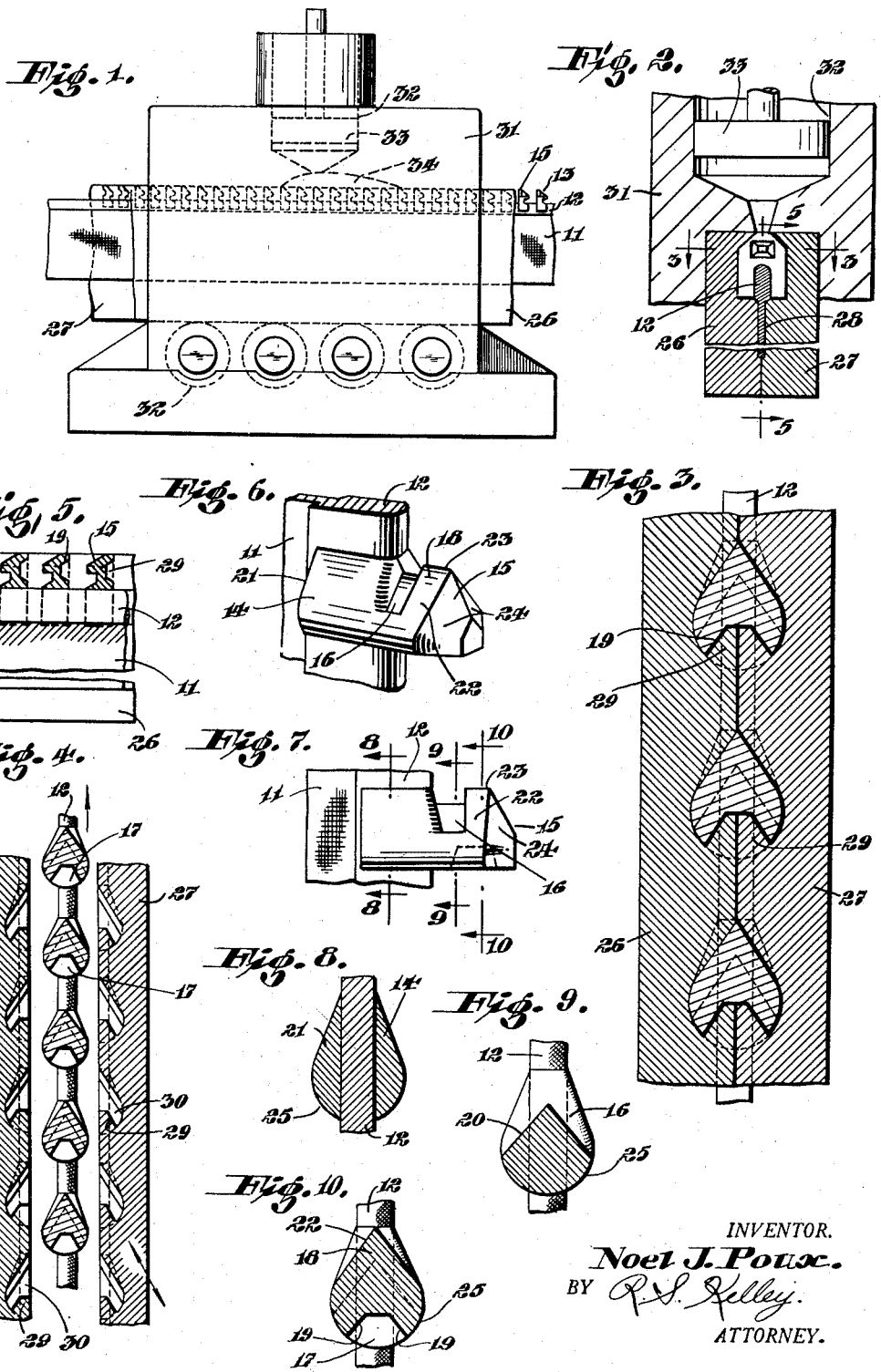
INVENTOR.
Noel J. Poux.
BY
ATTORNEY.

Patented June 29, 1943

2,322,908

UNITED STATES PATENT OFFICE 2,322,908

SLIDE FASTENER

Noel J. Poux, Meadville, Pa., assignor to Talon, Inc., a corporation of Pennsylvania Application December 19, 1940, Serial No. 370,851

2 Claims. (Cl. 24—205)

My invention relates to slide fasteners and their manufacture.

The general object of the invention is to provide a construction of slide fastener member which may be easily molded by a two part mold without the disadvantages of other fastener members which have been proposed which can be molded in two part molds.

The desirability of molding slide fastener members directly on the tape of slide fastener stringers has been recognized for a long time. It has been proposed to modify the shape of the fastener member by leaving one side of the pocket or recess open so that this recess can be formed by a core which extends from one of the mold parts. The resulting form of fastener, however, has disadvantages which have prevented its wide adoption in commercial use. Due to the presence of the necessary recess or pocket in the conventional form of fastener member, each recess facing the next adjacent fastener member of the series, the difficulty of molding the parts in gangs upon a stringer is apparent. One method which has been practiced is to mold them one at a time using a punch or core member coming in between the mold parts for forming the pocket, but in view of the fact that only one fastener member can be molded at a time this method of manufacture is relatively expensive. Various other attempts have been made by the use of flexibly connected mold sections, etc.

In accordance with my invention the individual fastener members and the mold parts for making them have been so shaped that the fastener members may be molded in gangs in the proper spaced relation on the tape by two-part molds which close on opposite sides of the tape. Instead of withdrawing the mold parts away from the tape after the fastener members have been molded thereon, in a direction perpendicular to the plane of the tape, the mold parts are withdrawn at an acute angle to the plane of the tape. The side walls of the recess and the outer side surfaces of the fastener member are shaped to conform substantially to this angle of withdrawal of the mold parts.

In the accompanying drawing I have shown for purposes of illustration one embodiment which my invention may assume in practice. In the drawing:

Fig. 1 is a diagrammatic side view of a molding apparatus for molding fastener members on a tape;

Fig. 2 is a vertical section through the molding apparatus;

Fig. 3 is a vertical enlarged section on line 3—3 of Fig. 2 showing a portion of a mold in accordance with my invention with the molded fastener members therein;

Fig. 4 is a view corresponding to Fig. 3 on somewhat reduced scale but showing the mold parts in open position;

Fig. 5 is a vertical section on line 5—5 of Fig. 3;

Fig. 6 is a perspective view showing the shape of a fastener member on the tape;

Fig. 7 is a side view showing a fastener member on the tape;

Figs. 8, 9 and 10 are cross-sections on lines 8—8, 9—9 and 10—10, respectively, of Fig. 7.

It will be understood that a slide fastener stringer consists generally of a flat tape 11 having a beaded edge 12 and a series of fastener members 13 (Fig. 1) mounted on this beaded edge in closely spaced relation. Each fastener member is bifurcated to provide arms 14 which embrace the beaded edge of the tape and a head portion generally designated 15 which projects from the edge of the tape. A notched portion 16 joins the head portion with the bifurcated portion. The head portion of each fastener member has a centrally located recess or pocket 17 facing the next fastener element of the series and an oppositely located projection 18 which is adapted to engage in one of the recesses 17 of a fastener member in a mating series. The recess 17 is closed at both sides by walls 19 which, as best seen in Fig. 10, are inclined to the longitudinal central plane of the fastener stringer at an acute angle. The notched portion 16 as seen in Fig. 9, has sides 20 tapering to a point and which are substantially parallel to the side surfaces 19 of the recess. At least the angle of inclination of these side surfaces as well as the other side surfaces of the fastener member, should not be greater than the angle of inclination of the sides of the recess to the central plane of the fastener stringer. The side surfaces 21 of the bifurcated portion of the fastener member as seen in Fig. 8, extend entirely to the tape at an acute angle which, in this instance, is substantially less than the angle of inclination of the side surfaces 19 of the recess. The side surfaces 22 of the projection 18 meet in a relatively sharp edge 23 and the inclination of these sides to the central plane of the fastener stringer is preferably substantially the same as the inclination of the side surface 19 of the recess, but at least their inclination is not greater. The head end of the fastener element is somewhat bevelled off as indicated by the bevelled surfaces 24 but in all cases it will be observed that the angle of inclination of the bevelled sides on any section taken parallel to the sections of Figs. 8, 9 and 10 will show an inclination to the central plane of the stringer no greater than the inclination of the sides 19 of the recess. It will be observed that the face of the fastener member in which the recess is located may be suitably rounded as indicated at 25.

The mold parts for molding the fastener members are generally designated 26 and 27 and they are adapted to part on the longitudinal central plane of the fastener stringer. As noted in Fig. 2, the mold parts are suitably recessed at 28 to clamp the flat portion of the tape and the beaded edge 12 which is adapted to extend into the individual mold cavities for molding the fastener members thereon. Each mold part carries core portions 29 extending one into each of the mold cavities 30 and preferably these core parts also separate in the central plane of the fastener stringer but, if desired, in some instances the entire core for forming the recess or pocket on a fastener member may be carried wholly by one of the mold parts. It will be observed without any more detailed description that the shape of the mold cavity corresponds to the shape of the fastener member which has been described in detail. The side surfaces of the core parts for example, incline at an acute angle to the parting plane of the mold, which corresponds to the desired angle of inclination of the sides of the recesses. Wherever the term "sides" is used herein and in the appended claims, the intention is to designate those faces or surfaces which have been indicated by the appropriate numerals on the drawing, as distinguished, for example, from the face of the fastener member through which the recess opens, and from the end faces thereof.

Any suitable molding apparatus may be used in conjunction with my improved two-part mold for molding my improved fastener members on the tape. As diagrammatically illustrated the mold parts 26 and 27 when closed together are of substantially rectangular shape and are fed through a suitable guideway in a molding machine 31 and supported during their movement therethrough on suitable rollers 32. The moldable material which may be of any suitable moldable plastic or metallic material can be supplied in any suitable manner and the illustration shows for this purpose a cylinder 32 and a piston 33 for forcing the material into the mold cavities through an orifice 34 which is elongated in the direction of the length of the fastener stringer so as to maintain pressure on the moldable material for a substantial time interval during the continuous movement of the mold parts through the molding machine. Preferably the mold parts are cut off flush with the head end of the fastener members so that the material is supplied directly to the mold cavities from the orifice 34 and the fastener members are wiped clean as they pass out of communication with the orifice 34.

As a result of my invention it will be observed that a form of fastener member for slide fastener stringers has been devised which without having the disadvantages heretofore pointed out, may be molded by the use of a two-part die. A two-part die corresponding in shape to the fastener members has angular surfaces which will form the desired shape of fastener member recesses as well as the outer surfaces and may be withdrawn from the molded stringer by movement at an angle to the central plane of the stringer corresponding to the angle of inclination of the sides of the recesses in the fastener member. The direction of movement of the mold parts in separating is indicated by an arrow in Fig. 4. During this separating movement the tape may be held stationary by a force applied in the direction of the upper arrow indicated in Fig. 4.

While I have shown and described in this application one embodiment which my invention may assume in practice, it will be understood that this embodiment is merely for the purpose of illustration and that various other forms may be devised within the scope of my invention, as set forth in the appended claims.

What I claim as my invention is:

1. A slide fastener stringer comprising a tape and a series of fastener members in spaced relation on the edge of said tape, each fastener member having arms which overlap the edge of the tape and a head portion projecting from the edge of the tape, said head portion having a recess facing the next adjacent element and an oppositely located projection facing in the opposite direction, the sides of the said recess being closed by walls which extend at an acute angle to the longitudinal central plane of the fastener stringer, all portions of the side surfaces of the fastener member being inclined at an angle to the center line of the fastener stringer which is not greater than the angle of the sides of said recess.

2. A slide fastener stringer comprising a tape and a series of fastener members in spaced relation on the edge of said tape, each fastener member having a bifurcated portion astride the edge of said tape and a head portion projecting from the edge of the tape, said head portion having a recess on one side facing the next fastener element and an oppositely located projection facing in the opposite direction, a notched portion separating the projection from the bifurcated portion, the sides of said recess being closed by walls which extend at an acute angle to a longitudinal central plane of the fastener stringer, and the outer surfaces of said bifurcated portion, said notched portion and said projection having no portion inclining at a greater angle to said longitudinal center line than the sides of said recess.

NOEL J. POUX.